US007764971B2

(12) United States Patent
Chu et al.

(10) Patent No.: US 7,764,971 B2
(45) Date of Patent: Jul. 27, 2010

(54) CONTROL PROCEDURE FOR SIMULTANEOUS MEDIA COMMUNICATIONS WITHIN A TALK GROUP IN COMMUNICATION NETWORKS FOR PUBLIC SAFETY

(75) Inventors: Thomas P. Chu, Englishtown, NJ (US); Michelle T. Emanuel, Aurora, IL (US); Charles Salisbury, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 680 days.

(21) Appl. No.: 11/715,774

(22) Filed: Mar. 8, 2007

(65) Prior Publication Data

US 2008/0220765 A1 Sep. 11, 2008

(51) Int. Cl.
*H04B 7/00* (2006.01)
*H04Q 7/20* (2006.01)

(52) U.S. Cl. .................. 455/518; 455/510; 455/512; 455/519; 455/416; 370/260; 370/312

(58) Field of Classification Search ......... 455/507–521, 455/416, 414.1; 370/260, 312, 229, 230, 370/351, 352
See application file for complete search history.

(56) References Cited

U.S. PATENT DOCUMENTS

| | | | |
|---|---|---|---|
| 6,263,066 B1 * | 7/2001 | Shtivelman et al. | 379/266.06 |
| 6,477,150 B1 * | 11/2002 | Maggenti et al. | 370/312 |
| 7,366,780 B2 * | 4/2008 | Keller et al. | 709/227 |
| 7,574,736 B2 * | 8/2009 | Salapaka et al. | 726/13 |
| 2005/0124365 A1 | 6/2005 | Balasuriya et al. | |
| 2007/0036151 A1 * | 2/2007 | Baeder | 370/352 |
| 2007/0049314 A1 * | 3/2007 | Balachandran et al. | 455/518 |

FOREIGN PATENT DOCUMENTS

| | | |
|---|---|---|
| GB | 2 320 861 A | 7/1998 |
| WO | WO 2005/043944 | 5/2005 |

OTHER PUBLICATIONS

Jerry Drobka, Motorola; P25 ISSI Trunked Console Interface Messages and Procedures, addendum to TIA-102.BACA; Internet Article; Apr. 27, 2006; pp. 1-21.
Retrieved from the Internet: URL:http://ftp.tiaonline.org/TR-8/APIC/PSAWG/06-046%20Trunking%20Console%20ISSI%20Architecture%20Mot.doc.
TIA Standard; Project 25 Inter-RF Subsystem Interface Messages and Procedures for Voice Services; TIA-102.BACA; EIA/TIA Standards, Telecommunications Industry Associations.
Arlington, VA, US, Aug. 1, 2006; XP017005565 sections: 2..1.1.1, 2.1.3.3, 2.1.4.3.6, 2.1.4.3.7, 4.3.2, 7.

* cited by examiner

*Primary Examiner*—Sujatha Sharma
(74) *Attorney, Agent, or Firm*—Carmen Patti Law Group, LLC (57) ABSTRACT

A method and apparatus are provided for a set of procedures that a push-to-talk (PTT) server can use to control multiple simultaneous media streams within a talk group. The present invention provides floor control messages and protocols for identifying, transmitting, and distributing the simultaneous media streams. The invention may be used with any real-time protocol (RTP) payload format as long as the encoding allows a receiver of the packets means to distinguish between the transmitting clients. Although the present invention provides server-based control of multiple transmissions, end-point-based transmission control procedures are supported.

35 Claims, 9 Drawing Sheets

CONTROL PROCEDURE FOR SIMULTANEOUS MEDIA COMMUNICATIONS WITHIN A TALK GROUP IN COMMUNICATION NETWORKS FOR PUBLIC SAFETY

TECHNICAL FIELD

This invention relates to the art of wireless telephony, and more particularly to control procedures that allow servers for push-to-talk voice communications to control simultaneous communications from multiple clients.

BACKGROUND

Push-to-Talk (PTT) is a voice communication service that allows a group to be interconnected using a "walkie-talkie" style of voice communications. Police, fire fighters, and emergency workers have communicated among themselves using PTT technology in public safety wireless networks for many years. Also, PTT is being used in commercial wireless networks, e.g., wireless networks operated by carriers such as AT&T, Verizon Wireless, Sprint Communications, Vodafone Group, etc., with diverse applications ranging from a small group of friends using a PTT conference to determine where to meet to a business supporting a fleet of cab drivers in a metropolitan area.

With push-to-talk, a member of a group speaks to all other group members simultaneously. Illustratively, when the member of the group wants to speak to the other group members, the member "pushes a button" on a handset, speaks, and releases the button. A Request message requesting permission to speak may then be sent from the handset to a PTT server. A floor control mechanism in the PTT server arbitrates all requests to speak in the event that two or more group members attempt to speak at the same time. The floor control mechanism either grants or denies the request by sending a Grant message or a Deny message as a response to the member. Upon granting the request, the floor control mechanism sends a floor Taken message to other members of the talk group to indicate that the floor has been granted to the member. When the member has been granted the floor, i.e., receives permission to speak, the audio signal of the member is transmitted to the PTT server, which replicates and distributes the packets to all other talk group members. This is known as a talk burst. Each PTT call consists of one or more talk bursts. When the member has finished speaking, the member releases the handset button. A floor release message, i.e., End message, is generated to notify the PTT server that the speaker has finished speaking, and has released the floor. The PTT server sends an idle message to all other talk group members to notify them that the floor is available. In some instances, the PTT server may send a Revoke message to a current floor owner to indicate that floor ownership is revoked.

The PTT server is responsible for ensuring that only one member speaks at a time and that the speech is distributed to all other group members who are authorized to listen. A PTT server may handle the communication needs of multiple talk groups simultaneously. The PTT server allocates resources for calls and de-allocates resources when they are no longer needed.

Commercial wireless networks do not support simultaneous voice transmissions within a PTT talk group, however, support of simultaneous audio streams in commercial systems being used in law enforcement is necessary. Public safety wireless networks are capable of providing limited support for simultaneous voice transmissions within a PTT talk group. The PTT server may designate one stream of audio from the client that has been granted the floor as "preferred", while other audio streams may be designated as "losing audio". Typically, preferred audio is broadcasted over the air to all of the recipients in a talk group, while losing audio is preconfigured to be sent only to pre-selected terminals, such as dispatcher consoles and logging devices. Illustratively, a call may be preempted by a higher priority call. However, the preempted call may still be important. The PTT server may allow the preempted member to continue speaking, but may send the audio to dispatchers and logging devices only. Also illustratively, an emergency call may lose in floor arbitration because another emergency call has the floor. The PTT server may direct the losing emergency call to the dispatchers and logging devices. Further illustratively, PTT control messages may become lost in the network. A handset could request the floor, but may not receive a response from the PTT server. As message delay is a major concern for public safety, many systems may wait for a short time and then allow the user to speak even without a Grant message. This is commonly referred to as "early audio". The PTT server may treat this early audio as losing audio if some other member has been granted the floor.

Disadvantageously, PTT control is specified for voice services only for simultaneous transmissions within a talk group in public safety networks. Also disadvantageously, the originator of the media stream, i.e., a handset, determines when to send simultaneous communications, which results in the PTT server reacting to the decision of the handsets in public safety networks. Further disadvantageously, simultaneous transmissions within a talk group in public safety networks are specified for specific narrow band technologies, i.e., Association of Public Safety Communications Officials (APCO) Project 25 networks (P25 networks). Thus, the PTT control messages are completely specified.

SUMMARY

It has been recognized, in accordance with the principles of the invention, that the problems of the prior art can be overcome by a technique for controlling simultaneous media streams from multiple clients. More specifically, the present invention provides a method for controlling simultaneous media streams from multiple clients in a Push-to-Talk (PTT) network having the steps of a) receiving, simultaneously, requests to transmit media streams from one or more clients to other members of a PTT talk group, b) designating, upon receipt of the requests, a first media stream from one of the one or more clients as preferred media and each remaining media stream as non-preferred media, and c) dynamically determining a destination for the non-preferred media based on an application specified treatment of the non-preferred media.

Also, the present invention provides an apparatus for controlling simultaneous media streams from multiple clients in a Push-to-Talk (PTT) network having a) means for receiving, simultaneously, requests to transmit media streams from one or more clients to other members of a PTT talk group; b) means for designating, upon receipt of the requests, a first media stream from one of the one or more clients as preferred media and each remaining media stream as non-preferred media; and c) means for dynamically determining a destination for the non-preferred media based on an application specified treatment of the non-preferred media.

DETAILED DESCRIPTION

The present invention provides a set of procedures that a push-to-talk (PTT) server may use to control multiple simultaneous media streams originating from multiple clients. Specifically, the present invention provides floor control messages and protocols for identifying, transmitting, and distributing the simultaneous media streams. The present invention is described within the context of a) Push to Talk over Cellular (POC) standard from the Open Mobile Alliance (OMA), i.e., OMA-POC, based networks and b) Association of Public Safety Communications Officials (APCO) Project 25 networks, i.e., P25 networks, based on Intra-RF Sub-Systems Interface (ISSI). OMA-POC and ISSI are the emerging standards supporting push-to-talk in commercial wireless network and public safety wireless networks, respectively.

Figure 1:
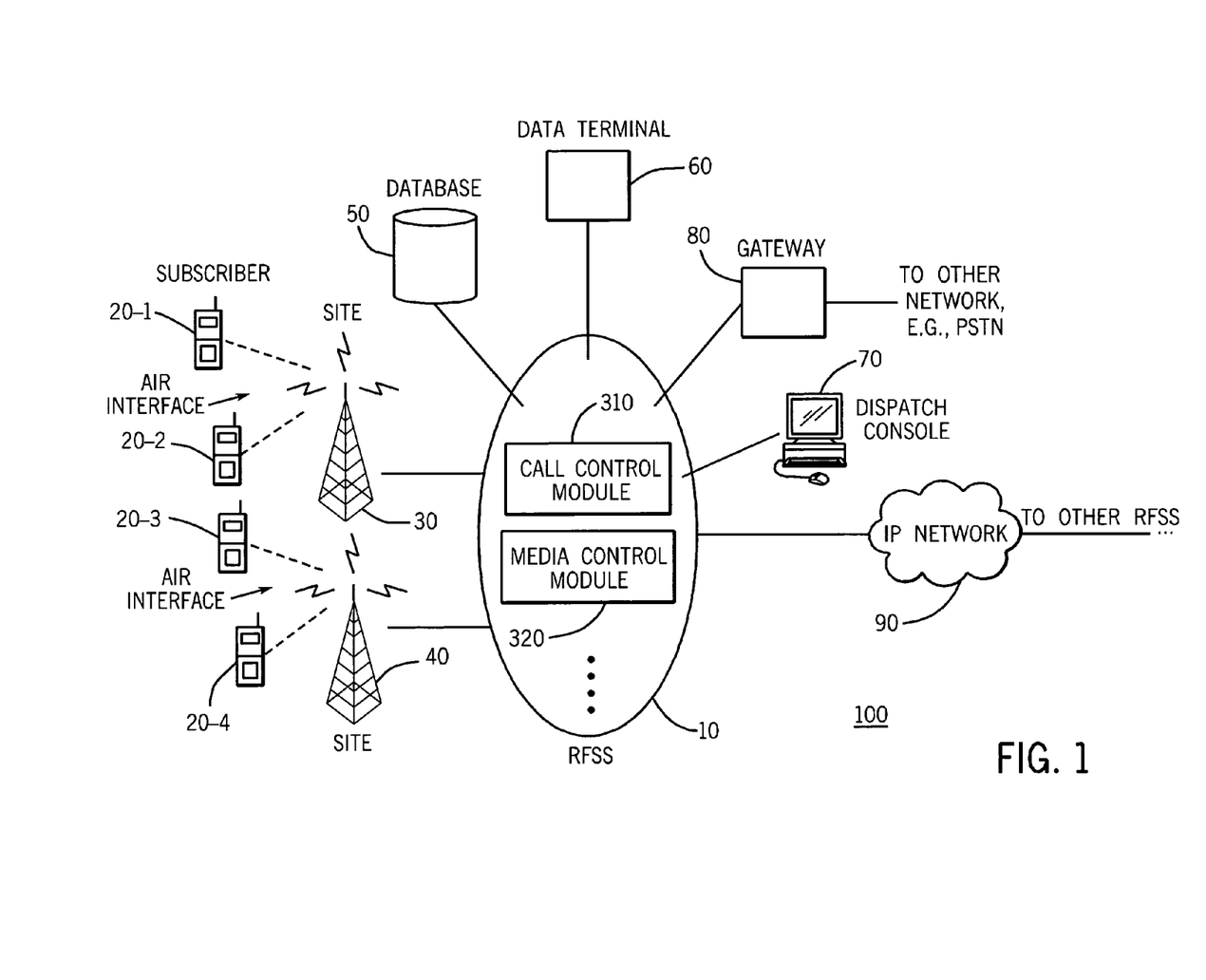
FIG. 1 shows an illustrative view of a network diagram arranged in accordance with the principles of the invention.

FIG. 1 shows an illustrative view of a network diagram arranged in accordance with the principles of the invention. As shown in FIG. 1, communications network 100 is a public safety wireless network that provides wireless connectivity to wireless communication handsets within a geographical area. Communications network 100 includes subscriber unit (SU) 20-1, SU 20-2, SU 20-3, and SU 20-4, collectively hereafter SU 20s, connected to base stations, referred to as "sites" in P25 terminology, over an air interface. SU 20-1 and SU 20-2 are connected to Site 20 and SU 20-3 and SU 20-4 are connected to Site 40. Site 30 and Site 40 are connected to a collection of controlling modules, collectively referred to as radio frequency sub-system (RFSS) 10. RFSS 10 is connected to several peripherals such as database 50, data terminal 60, and dispatch console 70 where dispatchers coordinate public safety activities. Also, RFSS 10 connects to Gateway 80 for access to other networks, e.g., Public Switched Telephone Network (PSTN), and IP network 90 for access to other RFSSs.

RFSS 10 has sub-components that provide call signaling functions, media control, i.e., forwarding and processing of voice traffic, and other functions. RFSS 10 may be connected to other RFSSs via an Intra-RF Sub-Systems Interface (ISSI) standard to form a larger network with a much larger coverage. With ISSI, the call signaling protocol is based on Session Invitation Protocol (SIP), while the push-to-talk control messages are carried through the use of Real Time Protocol (RTP) with or without voice frames. With ISSI, a talk group can span multiple RFSSs. RFSS 10 may be designated as the group home RFSS which will manage all activities of the talk group. The PTT server is considered to be part of the home RFSS in P25 networks. A floor arbitrate function of the talk group resides at the home RFSS. Members of a group may roam from the home RFSS to the other RFSSs. The non-home RFSS may be referred to as a serving RFSS, and is connected to the home RFSS through RTP. When a wireless communication handset at a serving RFSS indicates that it would like join a group, the serving RFSS will register to the home RFSS indicating that there are one or more SUs at its location joining the group. Specifically, when the SU requests the floor, e.g., permission to talk, the serving RFSS will forward the request to the home RFSS using ISSI. The home RFSS arbitrates the requests from the serving RFSS and awards the floor to the winning wireless communication handset. In addition to floor arbitration, the home RFSS also receives voice traffic from a serving RFSS and forwards the voice traffic to other RFSSs.

ISSI provides a set of control messages to support push-to-talk, which are encoded as part of the RTP messages. RTP connectivity must be established through call control before push-to-talk control messages and voice traffic can be sent between the home RFSS and the serving RFSSs.

When a member of a talk group joins the talk group, a call set up procedure must establish logical connections between the handset of the member and the PTT server for the transport of media traffic and PTT control messages. The logical connection for PTT control messages can be implemented in a number of ways, and the present invention accommodates all of them. In particular, the PTT control packets may be in-band, i.e., the PTT control packets are encoded within RTP packets. There are two variations of this method. First, PTT control messages and media traffic may be transmitted in separate User Datagram Protocol (UDP) packets. The payload-type parameter in the RTP packet header may be used to distinguish between the two types of packet payload. Second, PTT control messages and media traffic may be multiplexed within an RTP packet, i.e., transmitting PTT control messages over the same RTP connection that is carrying media connection, as in public safety P25 networks.

Also, the PTT control packets may be transmitted be out-of-band, i.e., the PTT control packets are conveyed over a logical connection distinct from the RTP connection that is carrying media connection. The protocol for the conveyance of these packets may be UDP, Real Time Control Protocol (RTCP)/UDP, etc.

The present invention allows multiple simultaneous transmissions to occur in a PTT talk group. The presence of multiple simultaneous transmissions implies that it is possible to have more than one active media stream, e.g., audio, data, video and images, within the talk group. Also, since multiple talk group members can speak concurrently, it is possible that a talk group member may be transmitting and receiving at the same time. The PTT server may designate media traffic from the talk group member that has been granted the floor as preferred media, which may be broadcasted to all active members of the talk group. Also, the PTT server may designate media traffic from a talk group member that has not been granted the floor, but allowed to transmit media traffic, as non-preferred media. The PTT server may indicate to the talk group member that the non-preferred media may be transmitted to a destination dynamically determined based on an application specified treatment of the non-preferred media. Therefore, the RTP over UDP over IP (IP/UDP/RTP) packets must be encoded so that a receiver can determine the identity of each client that generates a media stream. The present invention works with any encoding scheme of the IP/UDP/RTP packets. The only requirement is that the RTP packet-encoding scheme must provide a means to distinguish the separate handsets that are transmitting calls and everyone on the group call must use the same client identifier method. The PTT server may enable or disable the use of simultaneous media individually on a request by request basis.

A single physical device may house multiple PTT clients. The client may be in the user's handset or the client may reside in a network device deployed between the handset and the PTT server. Typically, the network device will be used to concentrate network traffic. The capabilities of these concentration devices vary, ranging from simply relaying packets to performing local arbitration for a set of devices.

Figure 2:
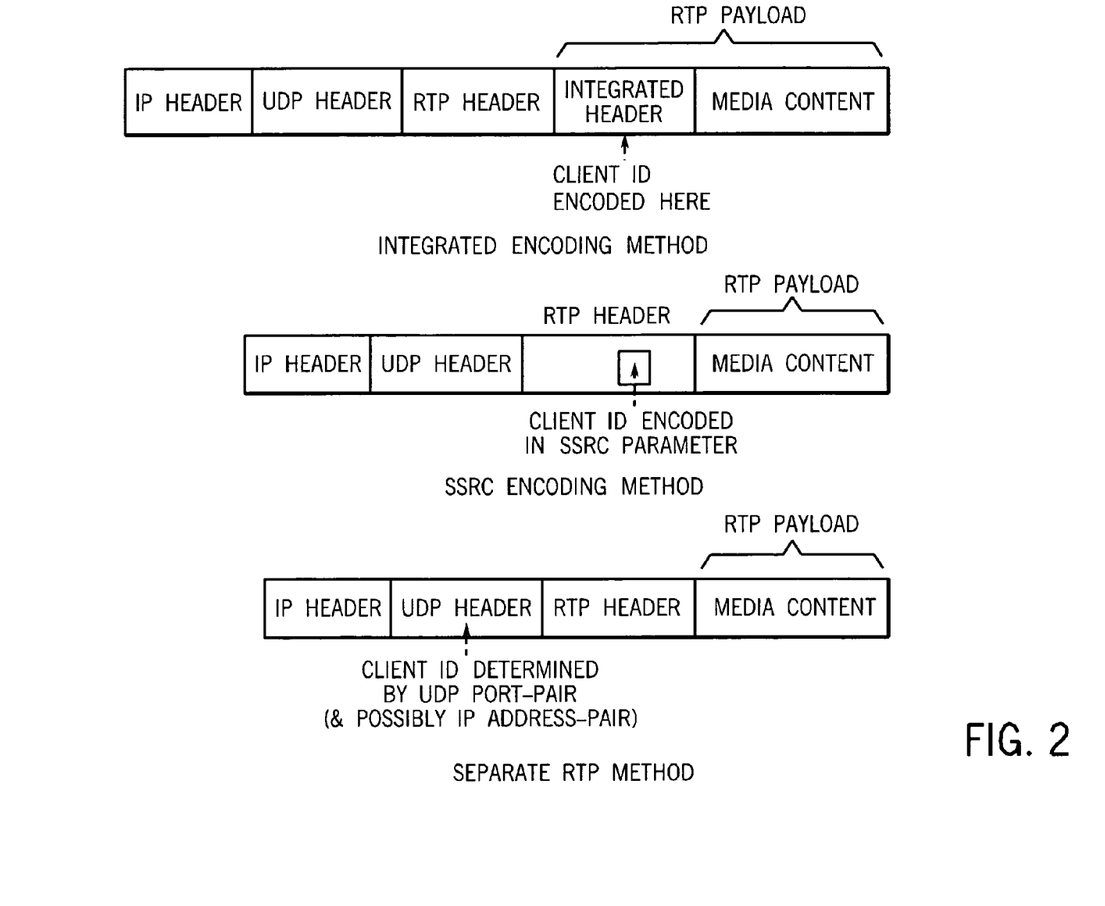
FIG. 2 shows three illustrative methods of identifying a client transmitting calls in a PTT talk group arranged in accordance with the principles of the invention.

FIG. 2 shows three illustrative methods of identifying a client transmitting calls in a PTT talk group arranged in accordance with the principles of the invention. A first method, referred to as the integrated method, identifies a client transmitting calls with a single RTP connection set up between the PTT server and each client module. In addition to media, each RTP packet payload contains information to identify the client and the RTP packet contains a field indicating whether the media is preferred or non-preferred.

A second method, referred to as the synchronization source (SSRC) method, identifies a client transmitting calls with a single RTP connection set up between the PTT server and each client module. Rather than placing a client identifier in the RTP payload, the SSRC field in the RTP packet header may be used to identify the client. All clients in a talk group must have a unique SSRC. The SSRC value can be pre-provisioned or assigned by the PTT server during registration or call set up. The randomized procedure as described in the RTP, Internet Engineering Task Force (IETF) Request for Comments (RFC) 3350 may also be used, although it may take some time to resolve collisions and ensure uniqueness.

A third method, referred to as the separate UDP method, identifies a client transmitting calls with multiple RTP connections set up between the PTT server and a single client module. This configuration allows one client to support multiple users and may be implemented by a concentration device in the network. Each connection may be identified by a unique pair of source and destination UDP ports, and the connection carries the traffic from a single end user. This is the only circumstance in which a client is associated with more than one end user. Again, a number of port assignment strategies are possible: a) a single UDP port is assigned at the client, while multiple UDP ports are assigned at the PTT server; b) a single UDP port is assigned at the PTT server, while multiple UDP ports are assigned at the client; and c) multiple UDP ports are assigned at both the client and the PTT server.

In another embodiment of the invention, the UDP port allocation may be performed through the use of Session Description Protocol (SDP) defined in a separate section within the SIP protocol.

The three methods of identifying a client transmitting calls in a PTT talk group are not mutually exclusive. Illustratively, clients may have a unique SSRC and the client identification may also be encoded in the RTP packets. Other methods of identifying clients may be used as well, as the present invention only requires that clients be identifiable from the media stream.

The present invention includes the following message parameters in PTT control messages. Note that these message parameters are logical entities and may be encoded in a number of ways.

Client Identifier, which identifies a caller in a talk group. The Client Identifier parameter has two subfields: i) Method identifier which identifies the method for encoding the client identifier, e.g., integrated, SSRC, separate UDP, or other; and ii) Identifier value which is encoded with the value of the client. For the integrated method, this value refers to the client identifier in the RTP packet. For the SSRC method, this value refers to the SSRC. For the separate UDP method, this value refers to the UDP port or source/destination port pair.

Treatment Indicator: In general, the treatment of non-preferred media is pre-specified by the application at the client receiving the media. The Treatment Indicator parameter provides more flexibility by allowing the PTT server to suggest to the receiving client different treatments for different streams of non-preferred media. Also, the Treatment Indicator may be used by the PTT server to indicate to the receiver of the client on how to handle incoming media packets. The list of possible treatments and encoding of this field is defined by the application. Depending on the application, transmission length time value may include SDP descriptions.

Transmission Length (TL) time value, which may be sent by the PTT server to a transmitting client indicating the maximum time allowable for transmission.

Wait Timer Value: In some instances, the PTT server may instruct a client to wait before it may take a certain action. Wait Timer Value specifies the length of time to wait.

Action-Indicator parameter may be used by the PTT server to indicate to the transmitter of the client an appropriate mode of operation. Depending on the application, the Action-Indicator parameter may include SDP descriptions. When using the Action-Indicator parameter, the PTT server can modify the characteristics of the media stream. Examples include a) terminate the request, b) transmit media with the understanding that the PTT server will treat it as non-preferred media, and c) for multimedia applications, transmit one media, e.g., audio only. Illustratively, the PTT server may suggest to the client a course of action to take upon the expiration of the Wait Timer. For multi-media applications, the Action-Indicator parameter may specify that only certain media may be transmitted, e.g., audio. For an application in which the media stream is a video stream which can be sent either at a pre-specified high bit rate or a specified low bit rate, the Action-Indicator may contain a single bit to specify the media stream. In another video application in which the source may send the video in different sizes, frame rates, and quality, the Action-Indicator may contain complex SDP parameters in order to specify the media stream. Thus, the encoding of the Action-Indicator depends on the application.

Priority parameter, which specifies the priority of the request from a client. The Priority parameter may be used by the PTT server to arbitrate floor requests from different clients.

Transaction Identifier: Each floor request from the client may be labeled with a distinct Transaction Identifier parameter. All messages pertaining to a particular request must be labeled with the same transaction identifier. The Transaction Identifier parameter is necessary if the system supports multiple simultaneous requests from the same client. Otherwise, the Transaction Identifier parameter is optional.

The present invention introduces two new PTT messages to the basic PTT control protocol and introduces new message parameters to some of the existing PTT messages. The new PTT messages are Proceed and Progress. The client generating messages will be identifiable from the contents of the message header or payload, as described above. The remaining parameters are optional, depending on the circumstances. If multiple simultaneous floor requests from the same client are supported, all messages should contain the Transaction Identifier parameter, which is used to identify the individual request.

Request: Originates from a client to the PTT server and may contain the Priority parameter. If the Priority parameter is not present, the PTT server must determine the priority of the request based on local policy, e.g., from the identity of the client, a default for all requests. A Request message may include the Action-Indicator parameter. The Action-Indicator parameter allows a client to describe to the PTT server the media characteristics of the media that the client intends to send. If absence, the default parameters of the talk group may be used.

Grant: Originates from the PTT server to a client and may contain a Transmission Length timer value and an Action-Indicator parameter.

Revoke: Originates from the PTT server to a client and may contain an Action-Indicator parameter. Illustratively, when the floor is revoked, the Revoke message could inform the client whether to terminate the call immediately, i.e., Revoke (terminate), or to continue sending media, i.e., Revoke (proceed), which the PTT server would treat as non-preferred.

End: No new parameters were provided for the End message. However, this message does contain an indicator to indicate whether media traffic will still be sent as non-preferred media traffic.

Taken: Originates from the PTT server to the client and may contain the Treatment Indicator.

Proceed: This new message may be sent from the PTT server to a client that has just requested the floor. A Proceed message informs the client that it has not been granted the floor, but the client may transmit media which the PTT server will treat as non-preferred media. The Proceed message may contain the following parameters: a) the client identifier to be used when sending the media packet, and optionally b) the TL timer value and c) the Action-Indicator.

Progress: This new message may be sent from the PTT server to a client that has just requested the floor. A Progress message informs the client that the request has been received and is being processed. The Progress message may contain the following parameters: a) the value of the Wait timer, and b) Action-Indicator parameter and Transmission Length timer value. Optionally, the Action-Indicator parameter and Transmission Length timer value may be conveyed in a subsequent Proceed or Grant message.

Idle: This message is sent by the server to clients at regular intervals to indicate that a group is idle, with no current floor owner. In some cases, the End message may be used for this purpose.

Figure 3:
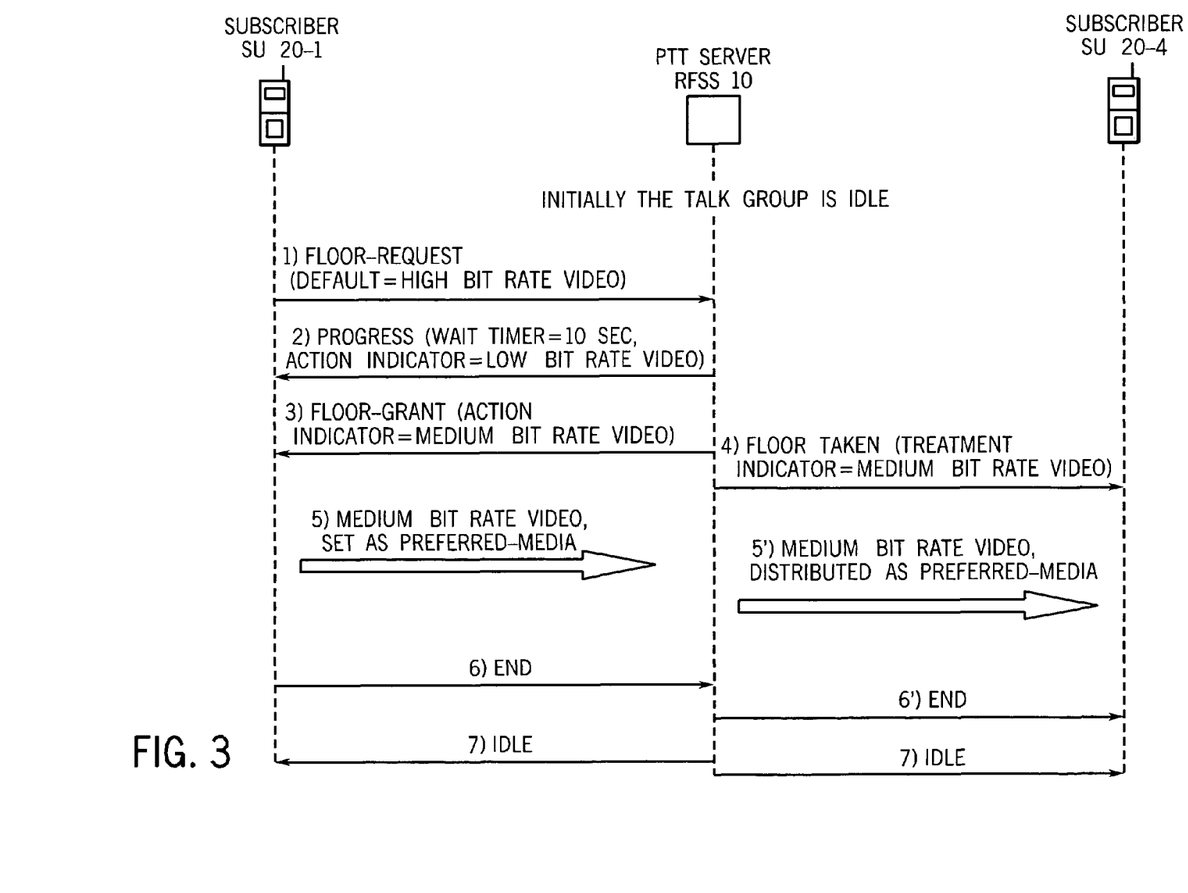
FIG. 3 shows an illustrative call flow for a method of operating the present invention arranged in accordance with the principles of the invention.

FIG. 3 shows an illustrative call flow for a method of operating the present invention arranged in accordance with the principles of the invention.

Initially, the talk group is at the idle state. At 1, when a client, e.g., SU 20-1, attempts to transmit a media stream, e.g., a video stream, to other members of the talk group, SU 20-1 transmits a floor Request message to the PTT server, e.g., RFSS 10, via a base station, e.g., Site 30, to request the floor. The default setting for this talk group is that the video stream may be transmitted using high bit rate.

At 2, the processing logic at the PTT server, e.g., RFSS 10, starts in an idle state. When RFSS 10 receives a PTT control message, e.g., floor Request message, RFSS 10 extracts the Client Identifier from the message, and then forwards the message to an internal protocol module associated with that client. RFSS 10 may ensure that there are enough resources in the network before granting the request to SU 20-1. RFSS 10 responds to the floor Request message with a Progress message encoded with a Wait Timer Value, e.g., 10 seconds, and an Action-Indicator parameter of low bit rate.

At 3, RFSS 10 determines that the network may currently support a video stream at medium bit rate. RFSS 10 sends a floor Grant message to SU 20-1 with an Action-Indicator parameter of medium bit rate.

At 4, RFSS 10 sends floor Taken messages to other members of the talk group, e.g., SU 20-4, indicating that SU 20-1 has been granted the floor, and the video stream is sent at medium bit rate through use of the Treatment Indicator.

At 5, upon receipt of the floor Grant message from RFSS 10, SU 20-1 begins to transmit the video stream at medium bit rate to the server. At 5', the server will distribute the video stream to other members of the group.

At 6, SU 20-1 completes the transmission of the video stream. SU 20-1 sends an End message to the server, which distributes the End message to all other members of the group. (See 6' in FIG. 3) This terminates the transmission spurt from SU 20-1.

At 7, the group now reverts to the idle state. The server will periodically broadcast the idle message to all members of the group to indicate this state.

In another embodiment of the invention, the floor Request message from SU 20-1 may contain an Action-Indicator parameter. The Action-Indicator parameter provides a client with the flexibility to alter the default condition when requesting the floor. Illustratively, SU 20-1 may initially desire to send the video at low bit rate even if the default is high bit rate.

Figure 4:
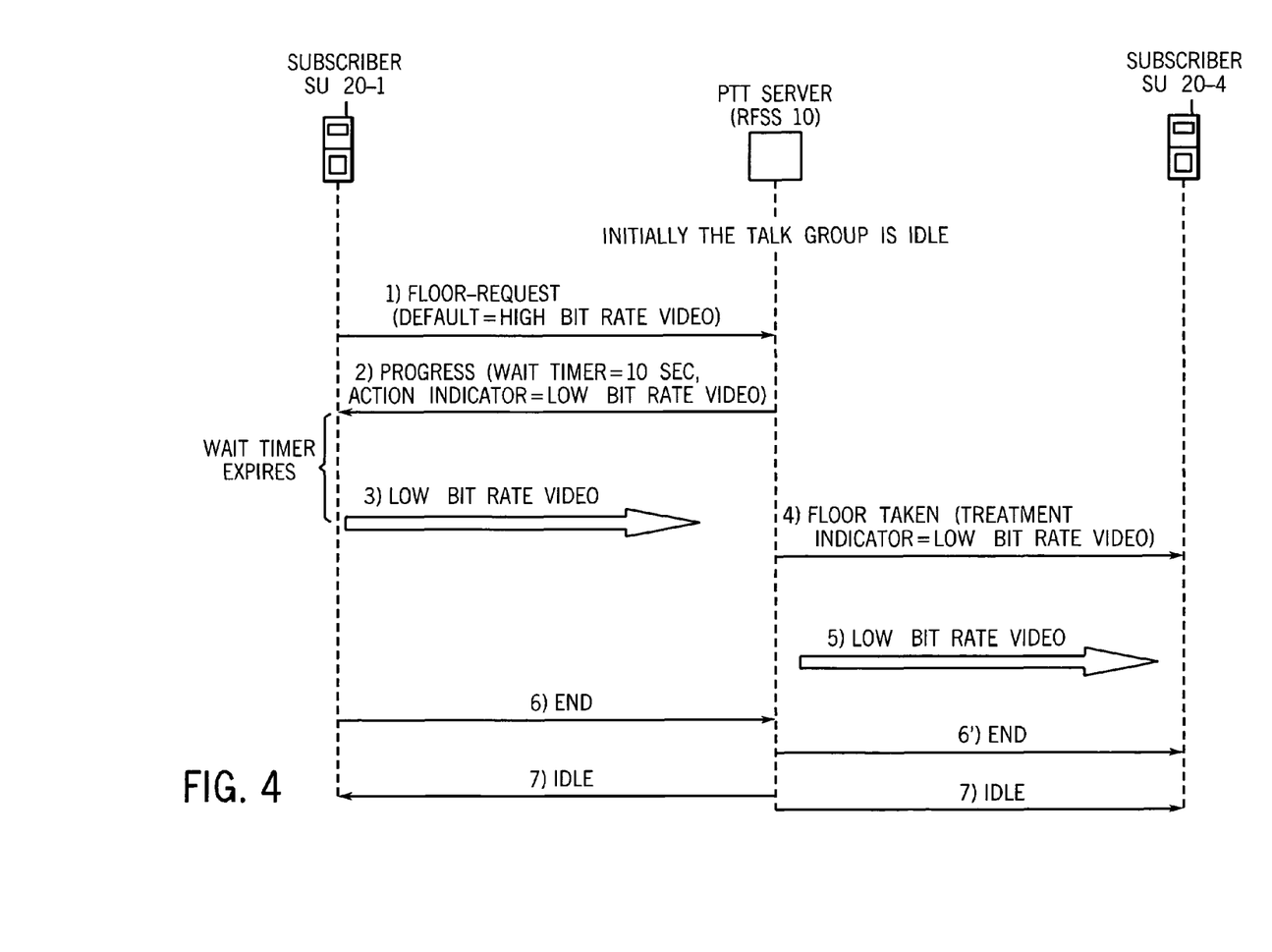
FIG. 4 shows another illustrative call flow for a method of operating the present invention in accordance with the principles of the invention.

FIG. 4 shows another illustrative call flow for a method of operating the present invention in accordance with the principles of the invention.

At 1, when a client, e.g., SU 20-1, attempts to transmit a media stream, e.g., a video stream, to other members of a talk group, SU 20-1 transmits a floor Request message to the PTT server, e.g., RFSS 10, via a base station, e.g., Site 30, to request the floor. The default setting for this talk group is that the video stream may be transmitted using high bit rate.

At 2, the Wait Timer Value, e.g., 10 sec, at a client, e.g., SU 20-1, expires before the client receives a response from the PTT server, e.g., RFSS 10.

At 3, SU 20-1 transmits a video stream at low bit rate, as instructed by an Action-Indicator in a Progress message received in step 2.

At 4, RFSS 10, upon receipt of the first video packets from SU 20-1, will first send a floor Taken message, with a Treatment Indicator indicating low bit rate video, to other members of the talk group.

At 5, RFSS 10 distributes the video packets to the talk group.

At 6, SU 20-1 completes the transmission of the video stream. SU 20-1 sends an End message to the server, which distributes the End message to all other members of the group. (See 6' in FIG. 4) This terminates the transmission spurt from SU 20-1.

At 7, the group now reverts to the idle state. The server will periodically broadcast the idle message to all members of the group to indicate this state.

Figure 5:
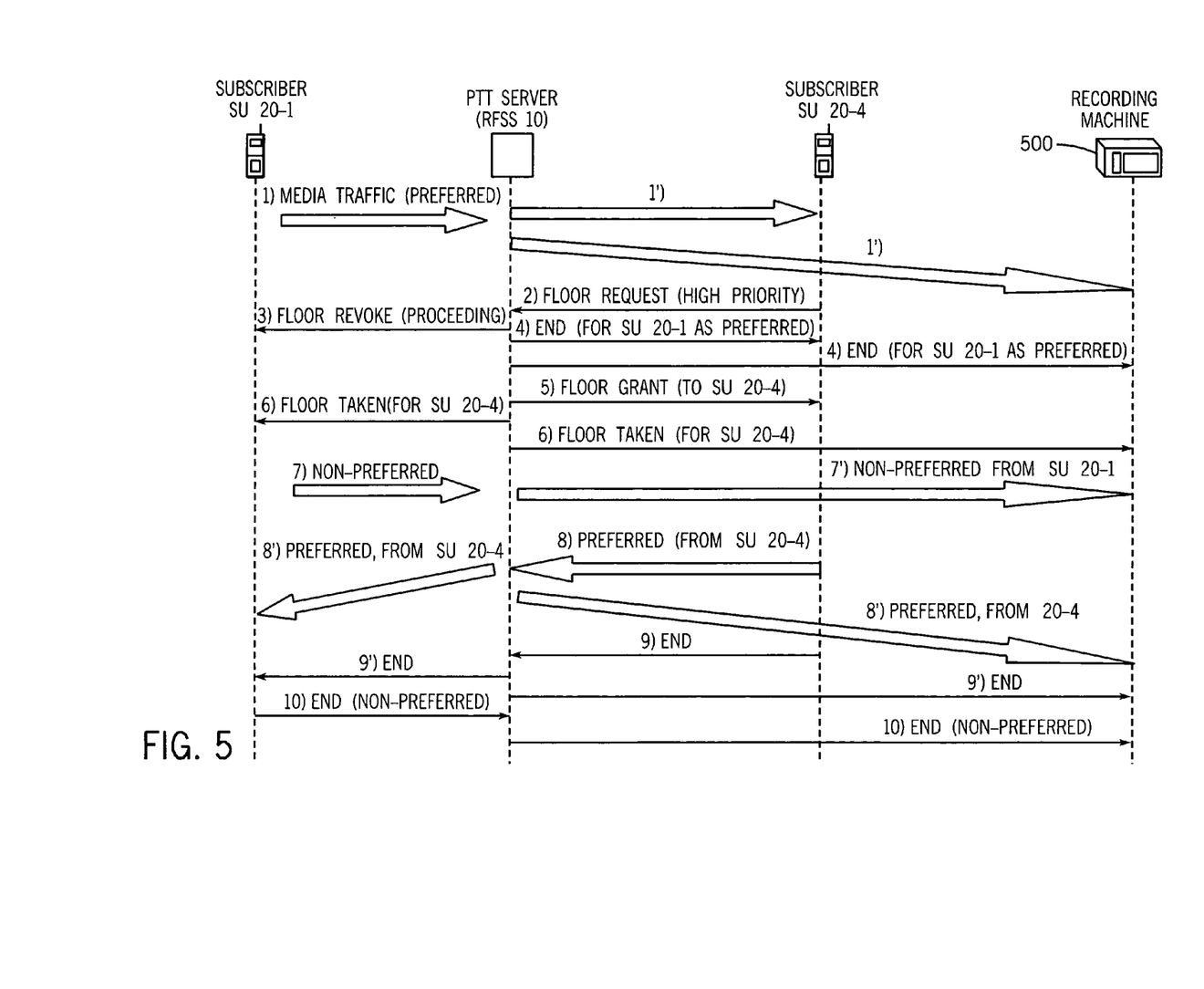
FIG. 5 shows yet another illustrative call flow for a method of operating the present invention in accordance with the principles of the invention.

FIG. 5 shows yet another illustrative call flow for a method of operating the present invention in accordance with the principles of the invention.

At 1, SU 20-1 is the current floor winner and is transmitting preferred media traffic to the PTT server, e.g., RFSS 10. At 1', RFSS 10 forwards this media traffic to other members of the talk group, e.g., SU 20-4, and to recording machine 500.

At 2, SU 20-4 has a high priority call, and SU 20-4 sends a high priority floor Request message to RFSS 10. RFSS 10 determines to grant the floor to SU 20-4, but allows SU 20-1 to continue to send the media stream to recording machine 500 as non-preferred media in multiple simultaneous transmissions.

At 3, RFSS 10 sends a Revoke message to SU 20-1, which informs SU 20-1 that he or she no longer has the floor. The Revoke message has an Action-Indicator instructing SU 20-1 to keep sending the media stream with the understanding the media stream will be sent to a restricted list of destinations, such as recording machine 500.

At the same time, at 4, the server sends the End message to all other members of group to indicate that SU 20-1 no longer has the floor and may only transmit as non-preferred.

At 5, RFSS 10 sends a floor Grant message to SU 20-4.

At 6, RFSS 10 sends a floor Taken message to other members of the talk group indicating that SU 20-4 now has the floor.

At 7 and 8, RFSS 10 forwards the media stream from SU 20-4 to the other members of the talk group as preferred media, and RFSS 10 forwards the media stream from SU 20-1 to recording machine 500 as non-preferred media.

At 9, SU 20-4 terminates its media transmission by sending an End message to RFSS 10, which forwards the End message to other members of the group.

At 10, SU 20-1 terminates its media transmission by sending an End message to RFSS 10, which forwards the End message to members that are receiving non-preferred media, e.g. recording machine 500.

Figure 6:
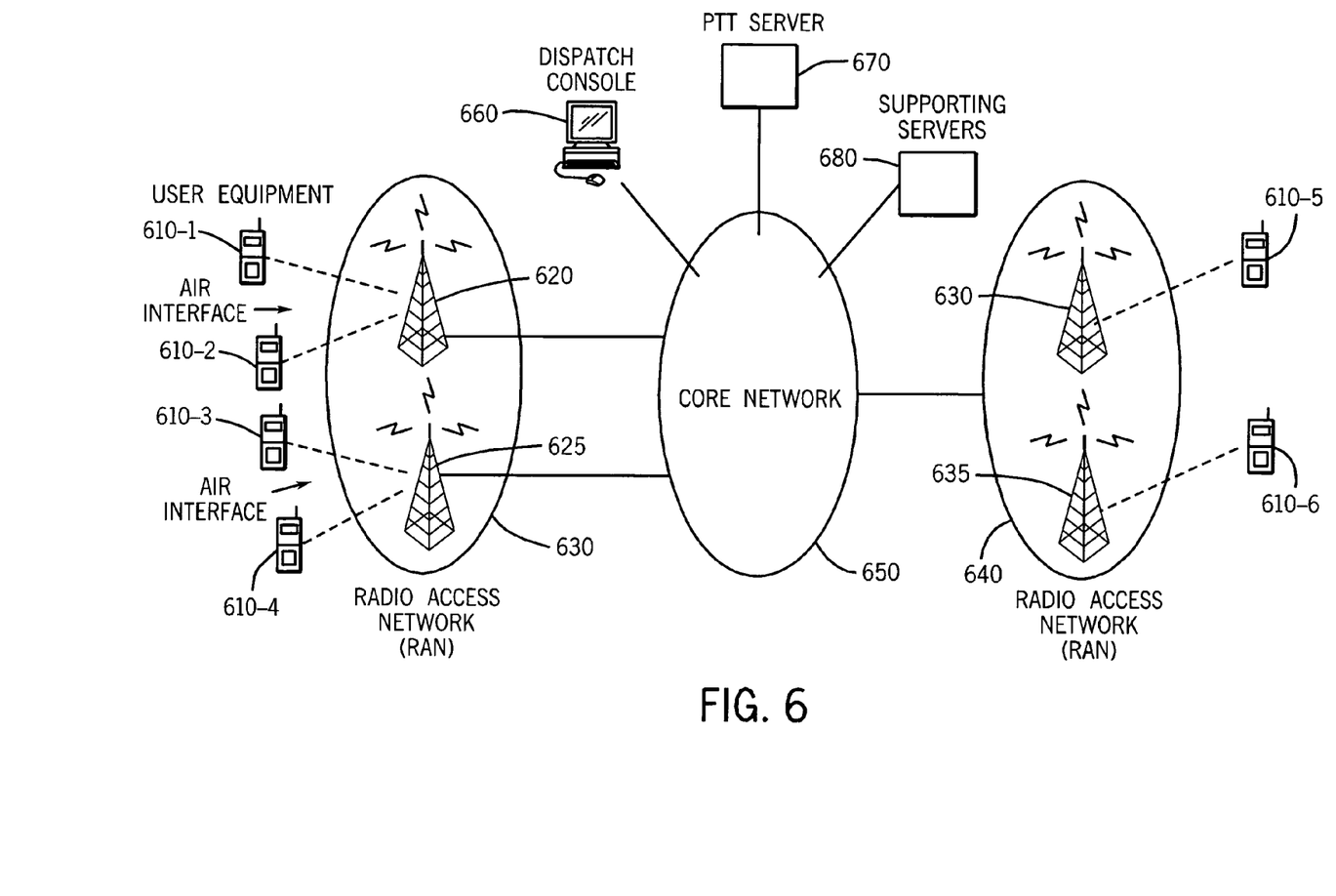
FIG. 6 shows another illustrative view of a network diagram arranged in accordance with the principles of the invention.

FIG. 6 shows another illustrative view of a network diagram arranged in accordance with the principles of the invention. In FIG. 6, user equipment (UE) 610-1, UE 610-2, UE 610-3, UE 610-4, UE 610-5, and UE 610-6 collectively hereinafter UEs 610, are handsets that run PTT client software and communicate over an air interface with a commercial wireless network based on OMA-PoC. Specifically, UE 610-1 and UE 610-2 are connected to base station 620, UE 610-3 and UE 610-4 are connected to base station 625, UE 610-5 is connected to base station 630, and UE 610-6 is connected to base station 635. The base stations are connected to a set of controlling network elements, not shown. Collectively, the base stations and the controlling elements are referred to as a Radio Access Network (RAN). Base stations 620 and 625 reside in Radio Access Network (RAN) 630 and base stations 630 and 635 reside in RAN 640. RAN 630 and RAN 640 are connected to Core Network 650.

PTT server 670 is connected to Core Network 650. Core Network 650 allows PTT server 670 to support subscribers on different RANs, which may have different types of access technologies, e.g., as Universal Mobile Telecommunications System (UMTS), Code Division Multiple Access Data Optimized (CDMA-DO), Wireless Fidelity (Wi-fi), and Worldwide Interoperability for Microwave Access (Wi-Max) networks, as will be appreciated by those of ordinary skill in the art. PTT server 670 may be thought of as having two logical components, which are a) a control component, which establishes and maintains communication links with the clients, and b) a media component, which distributes the audio media over these links.

Core Network 650 is connected to additional components including a dispatch console 660 and other supporting server devices 680, e.g., logging devices and key distribution devices.

The protocols for the conveyance of data streams in commercial wireless networks based on OMA-PoC are RTP, SIP, and Talk Burst Control Protocol (TBCP)/Real Time Control Protocol (RTCP). RTP specifies how the real time traffic, such as audio and video, is carried over Internet Protocol (IP) networks. SIP is the call signaling protocol used to establish RTP connectivity between UEs 610 and PTT server 670. TBCP/RTCP is the method used to convey push-to-talk control packets.

Figure 7:
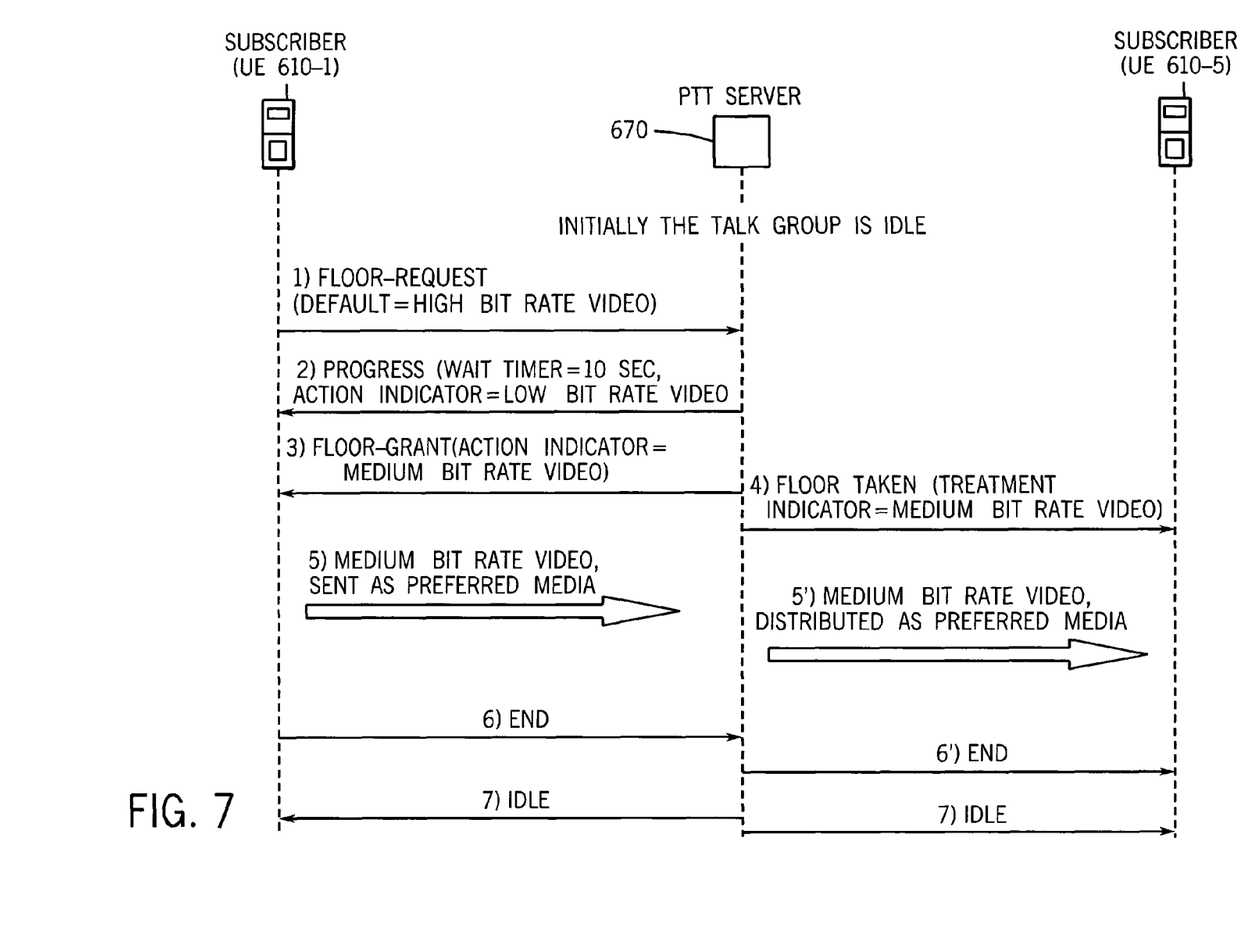
FIG. 7 shows an illustrative call flow for a method of operating the present invention in accordance with the principles of the invention for a commercial wireless network.

The above-described aspects of the present invention apply to the arrangement of FIG. 6. Illustratively, FIG. 7 shows a call flow for a method of operating the present invention arranged in accordance with the principles of the invention for a commercial wireless network.

Initially, the talk group is at the idle state. At 1, when a client, e.g., UE 610-1, attempts to transmit a media stream, e.g., a video stream, to other members of a talk group, UE 610-1 transmits a floor Request message to PTT server 670 via base station 620 to request the floor. The default setting for this talk group is that the video stream may be transmitted using high bit rate.

At 2, the processing logic at PTT server 670 starts at the idle state. When PTT server 670 receives a PTT control message, e.g., floor Request message, PTT server 670 extracts the Client Identifier from the message, and then forwards the message to an internal state machine associated with that client. PTT server 670 may ensure that there are enough resources in the network before granting the request to UE 610-1. PTT server 670 responds to the floor Request message with a Progress message encoded with a Wait Timer Value, e.g., 10 seconds, and an Action-Indicator parameter of low bit rate.

At 3, PTT server 670 determines that the network may currently support a video stream at medium bit rate. PTT server 670 sends a floor Grant message to UE 610-1 with an Action-Indicator parameter of medium bit rate.

At 4, PTT server 670 sends floor Taken messages to other members of the talk group, e.g., UE 610-5, indicating that UE 610-1 has been granted the floor, and the video stream is sent at medium bit rate through use of the Treatment Indicator.

At 5, upon receipt of the floor Grant message from PTT server 670, UE 610-1 begins to transmit the video stream at medium bit rate to the server. The server will distribute the video stream to other members of the group.

At 6, UE 610-1 completes the transmission of the video stream. UE 610-1 sends an End message to the server, which distributes the End message to all other members of the group. (See 6' in FIG. 7) This terminates the transmission spurt from UE 610-1.

At 7, the group now reverts to the idle state. The server will periodically broadcast the idle message to all members of the group to indicate this state.

In another embodiment of the invention, the floor Request message from UE 610-1 may contain an Action-Indicator parameter. The Action-Indicator parameter provides a client with the flexibility to alter the default condition when requesting the floor. Illustratively, UE 610-1 may initially desire to send the video at low bit rate even if the default is high bit rate.

Figure 8:
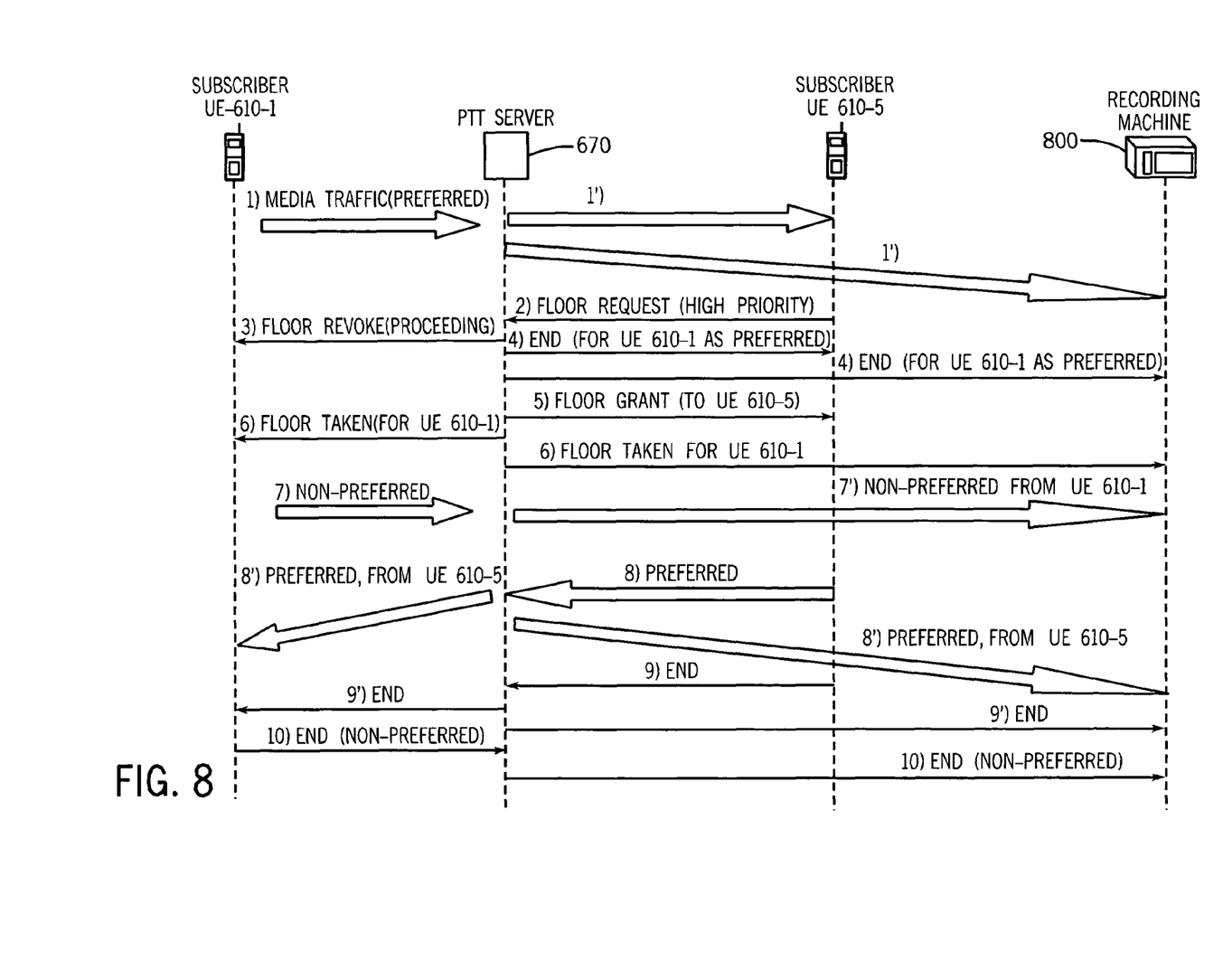
FIG. 8 shows another illustrative call flow for a method of operating the present invention in accordance with the principles of the invention for a commercial wireless network.

Also illustratively, FIG. 8 shows another call flow for a method of operating the present invention in accordance with the principles of the invention for a commercial wireless network.

At 1, UE 610-1 is the current floor winner and is transmitting preferred media traffic to PTT server 670. PTT server 670 forwards this media traffic to other members of the talk group, e.g., UE 610-5, and to recording machine 800.

At 2, UE 610-5 has a high priority call, and UE 610-5 sends a high priority floor Request message to PTT server 670. PTT server 670 determines to grant the floor to UE 610-5, but allows UE 610-1 to continue to send the media stream to recording machine 800 as non-preferred media in multiple simultaneous transmissions.

At 3, PTT server 670 sends a Revoke message to UE 610-1, which informs UE 610-1 that he or she no longer has the floor. The Revoke message has an Action-Indicator instructing UE 610-1 to keep sending the media stream with the understanding the media stream will be sent to a restricted list of destinations, such as recording machine 800.

At the same time, at 4, the server sends the End message to all members of the group to indicate that UE 610-1 no longer has the floor and may only transmit as non-preferred.

At 5, PTT server 670 sends a floor Grant message to UE 610-5.

At 6, PTT server 670 sends a floor Taken message to other members of the talk group indicating that UE 610-5 now has the floor.

At 7 and 8, PTT server 670 forwards the media stream from UE 610-5 to the other members of the talk group as preferred media, and PTT server 670 forwards the media stream from UE 610-1 to recording machine 800 as non-preferred media.

At 9, UE 610-5 terminates its media transmission by sending an End message to PTT server 670, which forwards the End message to other members of the group.

At 10, UE 610-1 terminates its media transmission by sending an End message to PTT server 670, which forwards the End message to members that are receiving non-preferred media, e.g. recording machine 800.

Figure 9:
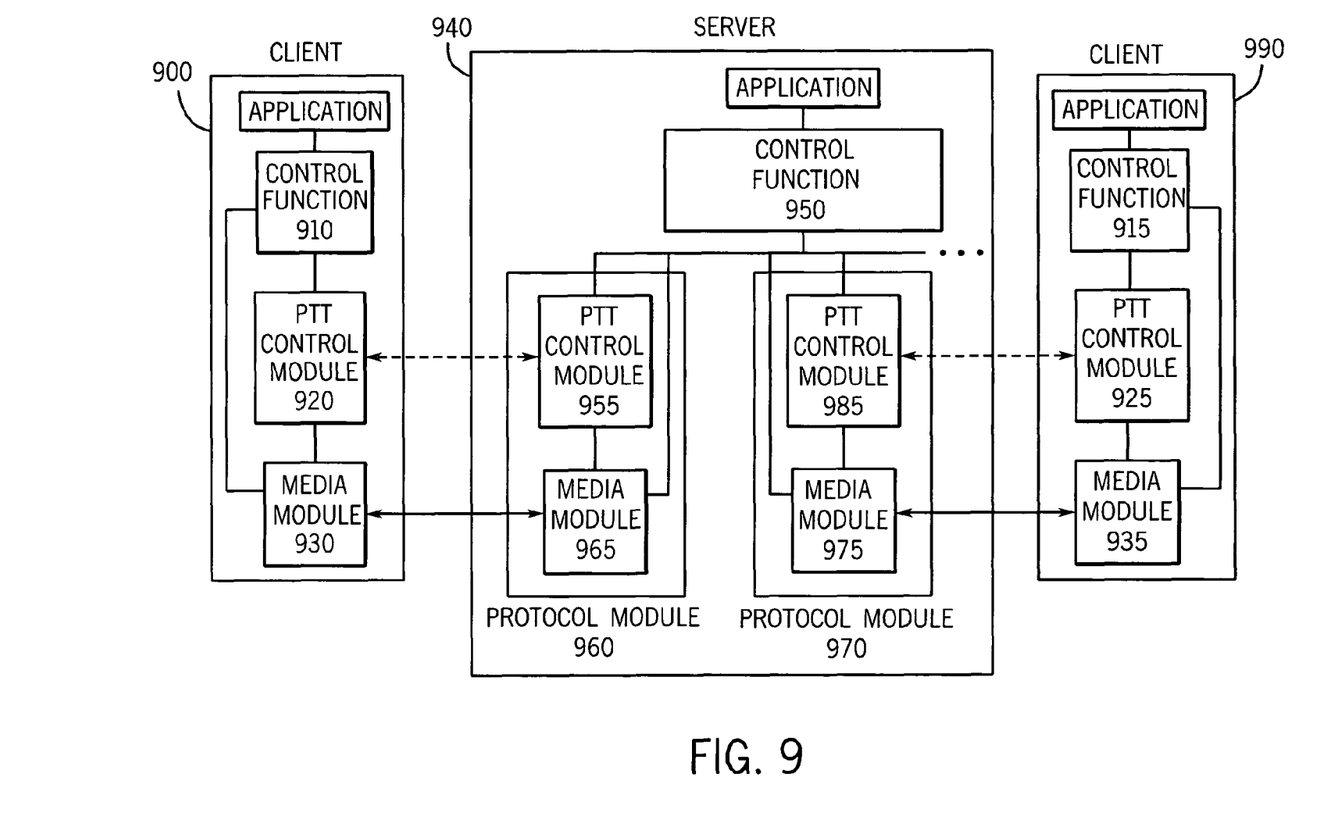
FIG. 9 shows an illustrative diagram of an architecture of a client and a server arranged in accordance with the principles of the invention.

FIG. 9 shows an illustrative diagram of an architecture of a client and a server arranged in accordance with the principles of the invention. Shown in FIG. 9 are Client 900, Server 940 and Client 990. Client 900 contains Control Function 910, which connects to PTT Control Module 920 and Media Module 930. Similarly, Client 990 contains Control Function 915, which connects to PTT Control Module 925 and Media Module 935.

Media Module 930 and Media Module 935 manage the transmission and reception of media traffic.

PTT Control Module 920 and PTT Control Module 925 manage the push-to-talk control functions. Illustratively, PTT Control Module 920 sends the Floor-Request message to Server 940 when Client 900 wants to gain access to the floor. PTT Control Module 920 instructs Media Module 930 to transmit media as preferred, non-preferred, or not to transmit media at all based on the response from the server.

Control Function 910 and Control Function 915 provide overall management of the PTT activities at Client 900 and Client 990, respectively. Control Function 910 and Control Function 915 manage aspects of an application that are policy based rather than protocol based. An application at each client controls the PTT function through these modules. Illustratively, Control Function 910, based on input from the application, may determine the characteristics of the transmitted media stream, such as bit rate, frame rate, etc.

Server 940 contains Control Function 950 which connects to multiple instances of a protocol module, e.g., Protocol Module 960, Protocol Module 970, etc., which are created for each client connected to Server 940. Protocol Module 960 contains Media Module 965 and PTT Control Module 955. Protocol Module 970 contains Media Module 975 and PTT Control Module 985. Media Module 965, which manages the transmission and reception of media traffic between Client 900 and Server 940, is the peer to Media Module 930. Media Module 975, which manages the transmission and reception of media traffic between Client 990 and Server 940, is the peer to Media Module 935. PTT Control Module 955, which manages the push-to-talk control functions between Client 900 and Server 940, is the peer to PTT Control Module 920. PTT Control Module 985, which manages the push-to-talk control functions between Client 990 and Server 940, is the peer to PTT Control Module 925. Also, Server 940 contains Control Function 950, which in addition to managing all of the individual instances of the protocol module, e.g., Protocol Module 960, Protocol Module 970, etc., also coordinates the activities between protocol modules. Illustratively, upon learning that Protocol Module 960 has received a high priority floor Request from Client 900, Control Function 950 may instruct Protocol Module 960 to send a Revoke message to the current floor owner, e.g., Client 990.

With simple extensions, the present invention may be extended to support multiple simultaneous requests from the same client. At the control level, all of the control messages may include a Transaction Identifier, which may be used to separate the messages from different requests. However, at the media level, the media packets associated with the different requests need to be identified to be separated at a receiver. Referring to FIG. 2, a) the Transaction Identifier may be part of the integrated header for the integrated method, b) each transaction may have its own SSRC for the SSRC method, and c) each transaction may be assigned a distinct UDP port for the separate UDP method.

Those skilled in the art will recognize that, in some instances, the functions of two more messages may be combined into a single message with multiple parameters. Illustratively, the Proceed message may be implemented to include the value of a Wait Timer as well as an Action-Indicator parameter. Upon receipt of this message, the client enters a Request-pending state and waits for either instructions from the PTT server or until the Wait Timer expires. If the Wait Timer expires, the client proceeds as instructed by the Action-Indicator parameter. Logically, this implementation is equivalent to sending a Progress message with an implicit Proceed message at the expiration of the Wait Timer.

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of controlling simultaneous media streams from multiple clients in a Push-to-Talk (PTT) network, the method comprising the steps of:
receiving, simultaneously, requests to transmit media streams from one or more clients to other members of a PTT talk group;
designating, upon receipt of the requests, a first media stream from one of the one or more clients as preferred media and each remaining media stream as non-preferred media;
dynamically determining a destination for the non-preferred media based on an application specified treatment of the non-preferred media; and
delivering the preferred media to the other members and the non-preferred media to the destination simultaneously.

2. The method of claim 1 wherein the media streams are selected from the group consisting of audio, data, video and images.

3. The method of claim 1 further comprising the step of informing the one or more clients of received and processed requests.

4. The method of claim 1 further comprising the step of instructing the one of the one or more clients to broadcast the preferred media to all active recipients in the PTT talk group.

5. The method of claim 1 further comprising the step of instructing the one or more clients to transmit the non-preferred media to the destination determined based on the dynamically determining step.

6. The method of claim 1 further comprising the step of transmitting PTT control messages and media in separate User Datagram Protocol (UDP) packets.

7. The method of claim 1 further comprising the step of transmitting PTT control messages over a logical connection distinct from a RTP connection carrying media connection.

8. The method of claim 1 further comprising the step of transmitting PTT control messages over a RTP connection carrying media connection.

9. The method of claim 1 further comprising the step of identifying the one or more clients associated with each of the received media streams.

10. The method of claim 9 wherein the identifying step further comprises the step of determining the identity of the one or more clients based on a) information contained in each RTP packet payload of the received media streams or b) a synchronization source (SSRC) field in each RTP packet header of the received media streams or c) a unique pair of source and destination User Datagram Protocol ports in an Internet Protocol header of a packet.

11. The method of claim 1 further comprising the step of instructing the one or more clients on the characteristics of the media stream to be transmitted by the one or more clients.

12. The method of claim 1 further comprising the step of instructing a receiving client on different treatments for the media streams.

13. The method of claim 1 further comprising the step of enabling or disabling the use of simultaneous media for the one of the one or more clients when requested by the one of the one or more clients.

14. The method of claim 1 further comprising the step of instructing a transmitter of one of the one or more clients to send only one media of a multi-media stream.

15. The method of claim 1 wherein the one or more clients are connected to a commercial wireless network.

16. The method of claim 1 wherein the one or more clients are connected to a public safety wireless network.

17. An apparatus for controlling simultaneous media streams from multiple clients in a Push-to-Talk (PTT) network, comprising:
means for receiving, simultaneously, requests to transmit media streams from one or more clients to other members of a PTT talk group;
means for designating, upon receipt of the requests, a first media stream from one of the one or more clients as preferred media and each remaining media stream as non-preferred media;
means for dynamically determining a destination for the non-preferred media based on an application specified treatment of the non-preferred media; and
means for delivering the preferred media to the other members and the non-preferred media to the destination simultaneously.

18. The apparatus of claim 17 wherein the media streams are selected from the group consisting of audio, data, video and images.

19. The apparatus of claim 17 further comprising means for informing the one or more clients of received and processed requests.

20. The apparatus of claim 17 further comprising means for instructing the one of the one or more clients to broadcast the preferred media to all active recipients in the PTT talk group.

21. The apparatus of claim 17 further comprising means for instructing the one or more clients to transmit the non-preferred media to the dynamically determined destination.

22. The apparatus of claim 17 further comprising means for transmitting PTT control messages and media in separate User Datagram Protocol (UDP) packets.

23. The apparatus of claim 17 further comprising means for transmitting PTT control messages over a logical connection distinct from a RTP connection carrying media connection.

24. The apparatus of claim 17 further comprising means for transmitting PTT control messages over a RTP connection carrying media connection.

25. The apparatus of claim 17 further comprising means for identifying the one or more clients associated with each of the received media streams.

26. The apparatus of claim 17 further comprising means for enabling or disabling the use of simultaneous media for the one of the one or more clients when requested by the one of the one or more clients.

27. The apparatus of claim 17 further comprising means for instructing a transmitter of one of the one or more clients to send only one media of a multi-media stream.

28. The apparatus of claim 17 wherein the one or more clients are connected to a commercial wireless network.

29. The apparatus of claim 17 wherein the one or more clients are connected to a public safety wireless network.

30. The apparatus of claim 17 further comprising means for instructing the one or more clients on the characteristics of the media stream to be transmitted by the one or more clients.

31. The apparatus of claim 17 further comprising means for Instructing a receiving client on different treatments for the media streams.

32. A server operable to receive, simultaneously, requests to transmit one or more multi-media streams from one or more clients to other members of a PTT talk group, wherein the server dynamically determines a destination for at least one of the one or more multi-media streams based on an application specified treatment of the at least one of the one or more multi-media streams, and wherein the server delivers preferred media of the one or more multi-media streams to the other members and the at least one of the one or more multi-media streams to the destination simultaneously.

33. The method of claim 1 further comprising the step of identifying the one or more clients associated with each of the received media streams based on information contained in each RTP packet payload of the received media streams.

34. The method of claim 1 further comprising the step of identifying the one or more clients associated with each of the received media streams based on a unique pair of source and destination User Datagram Protocol ports in an Internet Protocol header of a packet.

35. The apparatus of claim 1 further comprising the step of disabling the use of simultaneous media for the one of the one or more clients when requested by the one of the one or more clients.

* * * * *